United States Patent Office 3,303,751
Patented Feb. 14, 1967

3,303,751
POWER BRAKE BOOSTER
Thomas A. Bratten, Dayton, Ohio, assignor to General Motors Corporation, Detroit, Mich., a corporation of Delaware
Filed Apr. 13, 1965, Ser. No. 447,618
16 Claims. (Cl. 91—391)

The invention relates to a power brake booster which is preferably of the vacuum suspended type, and more particularly to such a booster which will provide a booster output force to a master cylinder which is directly proportional to input displacement within limits determined by the magnitude of the available power from the source. Another feature of a booster embodying the invention is the provision of an output force proportional to input force once the power source has been exhausted without the occurrence of an appreciable displacement lag between the two stages of operation. It is one of the more specific features of the invention to provide a booster wherein the manual input displacement is applied to a booster valve mechanism through a yieldable spring which also becomes at least a part of a manual force transmitting path when the power source has been exhausted at booster power run-out. Another specific feature of the invention is the provision of a manual force transmitting path including clutch means which operatively connects a manual force input member to the booster output member. It is also a feature of the invention to provide a force transmitting path between a manual input member, which also acts as a manually actuated valve actuating member, and clutch means connecting a booster output member with the valve actuating member. A booster embodying the invention preferably has a power wall and a reaction wall by means of which booster force is exerted to an output member and a lesser force which is proportional to the booster output force is transmitted to a vehicle operator through a portion of the booster valve mechanism and manual booster valve actuating means which is moved by a brake pedal.

Figure 1:
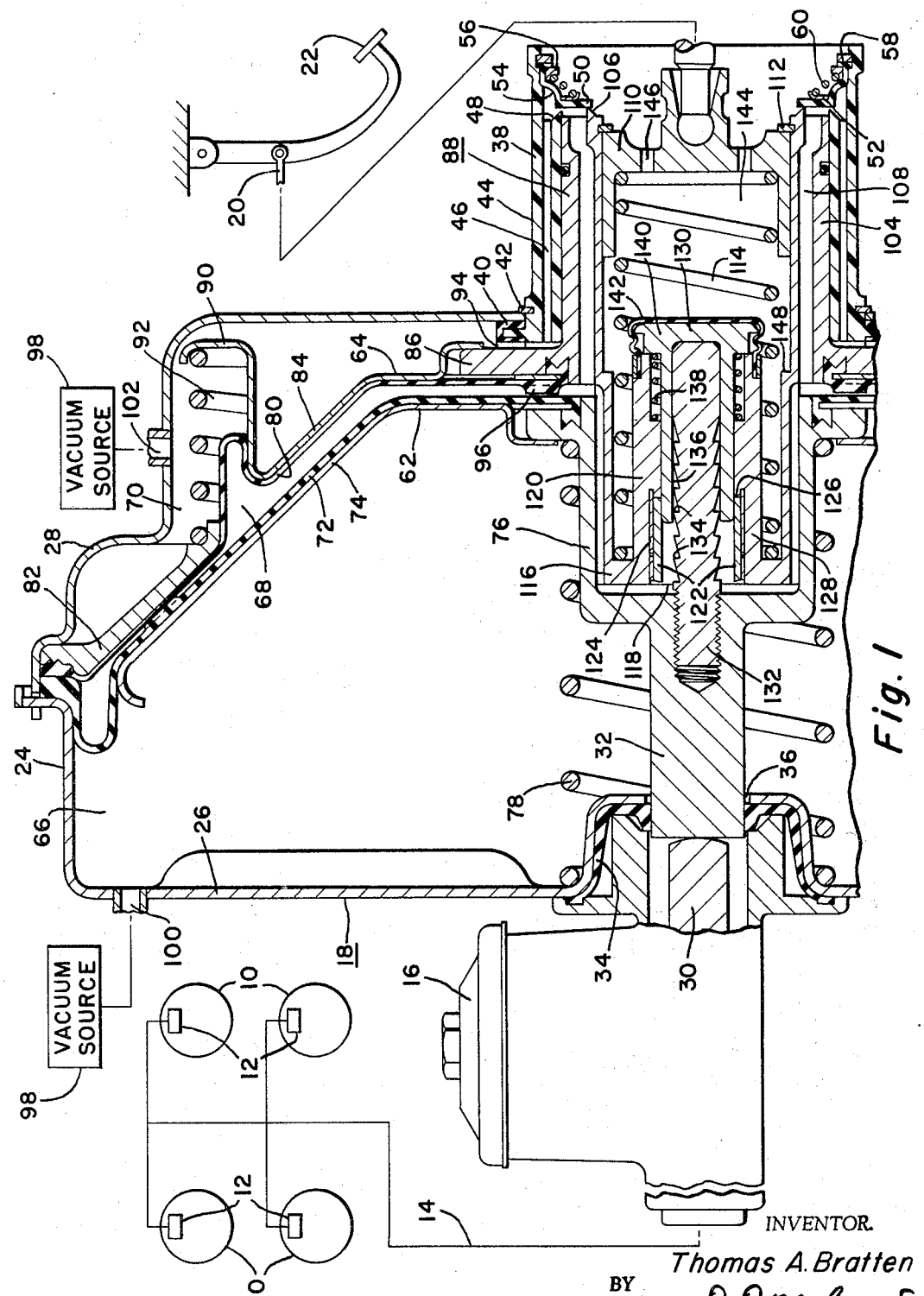
FIGURE 1 illustrates the invention with the brake system in the release condition, and shows parts of the mechanism broken away and in section.

The brake system illustrated schematically in FIGURE 1 includes the wheel brake assemblies 10, each of which has a wheel cylinder 12. A brake line 14 connects the wheel cylinders with the master cylinder 16. Thus pressure generated by the master cylinder actuates the wheel brake assemblies. The master cylinder is connected to the power booster 18 which in turn is operated by the push rod 20. Brake pedal 22 is suitably provided in a vehicle so that depression of the pedal by a vehicle operator moves the push rod 20 to actuate the booster.

The booster 18 has a housing 24 formed of a front housing section 26 and a rear housing section 28. The master cylinder 16 is suitably secured to the front housing section so that the master cylinder piston actuator 30 is in alignment with the booster output member 32. A suitable seal 34 is provided at the housing aperture 36 through which the output member 32 extends so as to seal the interior of the housing from the atmosphere and the interior the master cylinder 16.

A housing extension 38 is provided in the rear housing section 28 and also acts as a valve assembly housing. The forward end of housing 38 is formed as a flange around which seal 40 is received. The seal 40 and its mounting flange cooperate with a retaining member 42 to hold the housing in tightly sealed relation with the rear housing section 28. The housing section 38 is also a part of the valve assembly 44. As a part of the valve assembly, the housing is provided with passages 46 extending from the front of the housing to a rear portion adjacent the vacuum valve 48 formed as a part of the housing 38. An annular valve seat 50, which includes a spring seat 52, is mounted within the rear end of housing 38 so that it is engageable with valve 48. The valve seat includes a flexible diaphragm section 54. A spring seat and retainer 56 cooperates with snap ring 58 and a shoulder on the housing to hold the valve seat assembly in place. Spring 60, positioned between spring seats 52 and 56, urges the valve seat toward the vacuum valve 48.

Two power walls 62 and 64 are provided within housing 24 so that they divide the interior of the housing into a forward vacuum chamber 66, a center variable pressure chamber 68, and a rear vacuum chamber 70. The forward power wall 62 provides the booster power. This wall is formed of a power diaphragm 72, a diaphragm support member 74, and the power piston 76 which is illustrated as being an integral part of the booster output member 32. The support member 74 is secured to the power piston 76, as the power diaphragm 72, in a suitable well known manner. The outer periphery of the diaphragm is secured to the housing 24 so that the diaphragm may have a rolling action during its reciprocable movement within the housing. A power piston return spring 78 is positioned between the front housing section 26 and the power piston 76 so that the power wall 62 is urged rearwardly to the release position.

The rear power wall 64 is a power reaction wall. It includes a reaction diaphragm 80 which has its outer periphery secured to the housing 24. A spring seat 82, also secured to the housing 24 adjacent the outer periphery of diaphragm 80, provides a support for an outer portion of the diaphragm. The power wall 64 also includes a reaction diaphragm support member 84 which is secured at its inner periphery to flange 86 of a valve assembly member 88. The inner periphery of the reaction diaphragm is also secured to flange 86. The outer periphery of the support member 84 is formed to provide a spring seat 90 so that the return spring 92 extends between the spring seat 82 and the spring seat 90. Thus spring 92 urges the power wall 64 rearwardly so that the stops 94 on flange 86, formed as spaced bosses, normally engage seal 40 and keep the flange 86 in spaced relation to that seal and to the forward end of housing 38. Thus the rear vacuum chamber 70 is in fluid communication with passage 46 at all times. The forward side of the inner periphery of reaction diaphragm 80 is provided with spaced stops 96 which keep the diaphragms 72 and 80 apart. Thus the variable pressure chamber 68 is defined by the two diaphragms 72 and 80. The forward vacuum chamber 66 is defined by the front housing section 26 and the power diaphragm 72. A vacuum source 98 is connected to a port 100 in the front housing section 26 so that vacuum is provided in chamber 66. The rear vacuum chamber 70 is defined by the diaphragm 80 and the rear housing section 28. The vacuum source 98 is also connected to port 102 formed in housing section 28 so that vacuum is likewise provided in chamber 70. The intake manifold of the vehicle engine may be used as the vacuum source.

Figure 2:
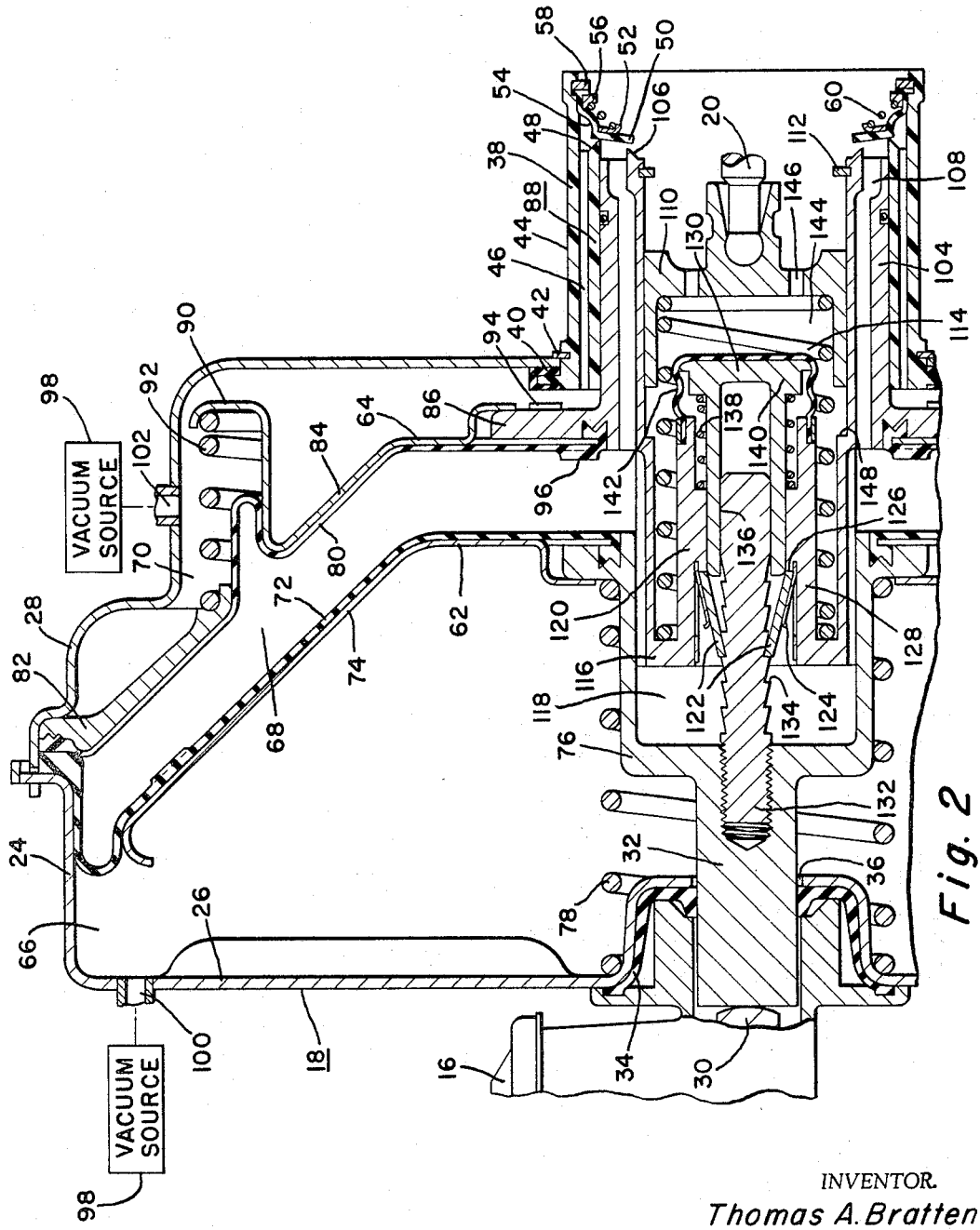
FIGURE 2 is similar to FIGURE 1 but showing the booster mechanism in the condition wherein power run-out has occurred.

The valve assembly member 88 has several functions. In addition to its flange 86 supporting the reaction power wall, it has a piston section 104, the rear end of which is formed to provide air valve 106. Valve seat 50 is also engageable with air valve 106. Passages 108 in the piston section 104 connect with the outer periphery of air valve 106 and also with the variable pressure chamber 68. The piston section 104 has a rear portion thereof provided as a cylinder in which a manually actuated piston 110 is reciprocably received. Piston 110 is urged against a retainer ring 112, which provides a rear stop, by a spring 114. The forward end of spring 114 seats against a spring seat section 116 of assembly 88. The spring seat section 116 extends into a cylindrical portion of power piston 76 and in spaced relation thereto so that the chamber 118 within power piston 76 is connected with the variable pressure chamber 68. Another cylindrical section 120 of valve assembly member 88 extends rearwardly from the spring seat section 116 and in radially inward spaced relation to the forward portion of piston section 104 so that spring 114 is received about it. The forward end of cylindrical section 120 is recessed so that a plurality of pawls 122 fit longitudinally therein. Pawl springs 124 are received in the recess radially outward of pawls 122 so that the pawls are urged pivotally inward from the position shown in FIGURE 1 to that shown in FIGURES 2 and 3. The rear ends of the pawls 122 abut a shoulder 126 formed by the recess containing the pawls. A center portion 128 of section 120 provides a cylinder in which a recessed piston 130 is received. A ratchet bar 132, having a series of teeth 134, is suitably secured to the booster output member 32 and extends rearwardly through chamber 118 and into the forwardly extending recess 136 of piston 130. The pawls 122 and the teeth 134 of ratchet bar 132 provide force transmitting clutch means. The rear end of the cylindrical section 120 is recessed to provide a shoulder acting as a spring seat for spring 138. Piston 130 has a head 140 against which spring 138 also acts. A sealing diaphragm 142 is secured to the rear end of section 120 and fits over piston head 140 so that chamber 118 is sealed from chamber 144. Chamber 144 is the chamber in which spring 114 is received. It is vented to atmosphere by suitable vents 146 in the manually actuated member 110. Thus piston 130 and diaphragm 142 provide a power wall which is normally held in the position shown in FIGURE 1 when a pressure somewhat less than atmospheric pressure is provided in chamber 118. The portion of piston 130 extending forwardly extends sufficiently forwardly to be positioned radially inward of pawls or fingers 122 so as to hold them in the position shown in FIGURE 1. When, however, the absolute pressure in chamber 118 increases to a predetermined pressure differential in relation to the atmospheric pressure, as determined by the force of spring 138 and the effective area of the power wall formed by piston 130 and diaphragm 142, spring 138 moves the piston rearwardly so that the pawl springs 124 pivot the forward ends of the pawls inwardly to engage teeth on the ratchet bar 132. This condition is shown in FIGURE 2.

In normal booster operation, with the booster in the release position as shown in FIGURE 1, the power wall 62 is held in the positon shown by return spring 78. The power reaction wall 64 is held in the position shown by return spring 92. Vacuum is found in chambers 66 and 70. Since the valve assembly member 88 is held in the position shown by the reaction return spring 92, the vacuum valve 48 is unseated and the air valve 106 is seated relative to valve seat 50. Thus chamber 70 is connected with variable pressure chamber 68 through passages 46 and 108 around vacuum valve 48. Vacuum is, therefore, found in chamber 118, and piston 130 therefore holds pawls 122 in the clutch release position. When the operator depresses the pedal 22, he moves the valve actuating member 110 against the force of spring 114. The spring will yield slightly and transmit the manual force to the valve member 88, thus moving air valve 106 forwardly. Spring 60 will move valve seat 50 forwardly until the seat engages vacuum valve 48. With both valves 48 and 106 engaging valve seat 50 a lapped or poised condition is obtained. Further movement of the pedal 22 causes valve assembly member 88 to move further forward, thus opening air valve 106. Atmospheric pressure is thereby permitted to enter variable pressure chamber 68 in a controlled amount. Since this is an increase in pressure relative to the pressure in chambers 66 and 70, the differential pressure acts on power wall 62 to move the booster output member 32 forward against the force of return spring 78. This movement is transmitted through the piston actuator 30 of the master cylinder assembly 16 to pressurize fluid in brake line 14 and apply the brakes. The movement of valve assembly member 88 also moves the power reaction wall 64. The differential pressure acting on the power reaction wall as the pressure in chamber 68 increases causes a return movement of the reaction wall and the valve assembly member 88 until the air valve 106 reengages valve seat 50. Thus the valve assembly is returned to the lapped position and the booster is held in a position determined by the amount of force exerted by the operator through pedal 22. In the return movement of valve assembly member 88, spring 114 is further compressed. This reaction force through the spring and through the manually actuated piston 110 gives the vehicle operator a feel of the brake application.

If the operator actuates the booster to its fullest extent so that the pressure in chamber 68 approaches atmospheric pressure, spring 138 will overcome the differential pressure acting on piston 130 and diaphragm 142 and will move the piston to the right relative to the cylindrical section 120 of assembly 88 and also relative to the ratchet bar 132. This is a condition referred to as booster power run-out. The condition is such that the booster is incapable of producing additional movement of the output member by differential pressures acting on the power wall 62. The rightward movement of piston 130 actuates the clutch means composed of the pawls 122 and the ratchet bar 132. As can be seen in comparing FIGURE 1 to FIGURE 2, the rightward movement of the forward end of piston 130 moves the piston end out of supporting relation with the pawls 122 so that the pawl springs 124 pivot the forward ends of the pawls inwardly until they engage teeth 134 on ratchet bar 132. The rear ends of the pawls 122 remain engaged with the shoulder formed as a part of cylindrical section 120. Also spring 138 reaches its expanded length so that the forward end of piston 130 is not entirely removed from under the pawls 122. At the time that this occurs, spring 114 will have been compressed, but not necessarily to the point where the forward end of piston 110 engages the shoulder 148 formed on an inner cylindrical part of assembly 88. The assembly is therefore positioned as shown in FIGURE 2 because it has reached the power run-out condition. The air valve 106 will remain open relative to the valve seat 50 and the chamber 68 will have atmospheric pressure therein. Chamber 108 will also be at atmospheric pressure, including the portion of the chamber contained within piston 130. This chamber portion is suitably vented to chamber 118 by providing ratchet bar 132 as a loose fit within the recess 136. Suitable grooves or passages may be provided for such venting if a somewhat tighter fit is utilized.

Figure 3:
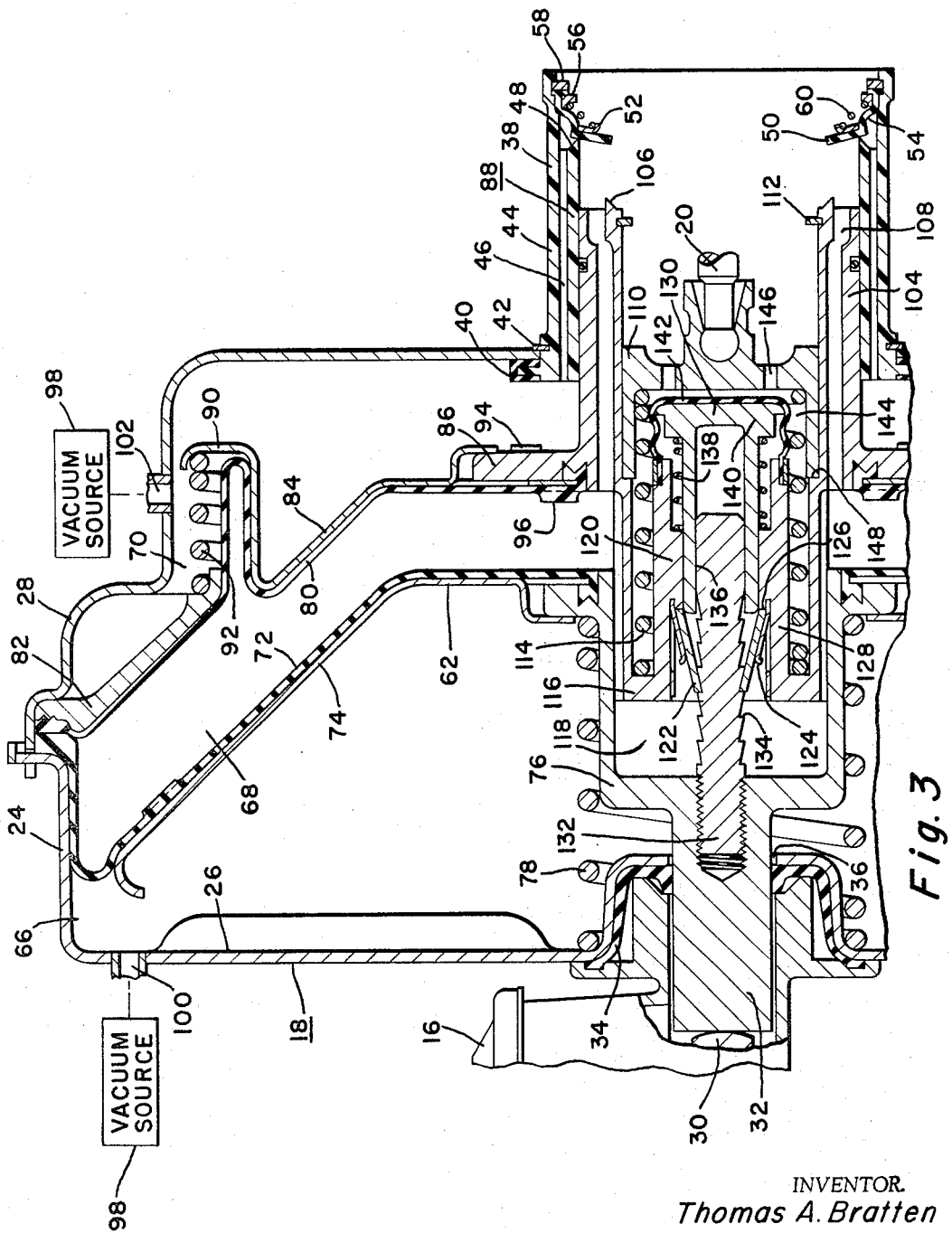
FIGURE 3 is similar to FIGURE 2 and shows the booster in a manual force transmitting condition.

Additional pedal force exerted by the operator will transmit force through a path from the manually actuated valve actuating member 110 and through spring 114 to the spring seat section 116 of assembly 88 and then through assembly 88 and pawls 122 to ratchet bar 132. Thus the clutch engaging action of the pawls 122 and the ratchet bar 132 mechanically connect the output member 32 with the push rod 20. As the additional force is applied by the operator, it is therefore also applied by the output member 32 to the piston actuator 30. Should the operator apply sufficient additional force, spring 114 will be compressed until the forward end of piston 110 engages shoulder 148, thereby establishing a force transmitting path which is parallel to spring 114 and through which additional force may be transmitted from the piston 110 to the member 88. This condition is shown in FIGURE 3. Thus the operator can mechanically actuate the master cylinder 16.

Upon release of the brake pedal 22 by the operator, return spring 92 moves the power reaction wall 64 and the member 88 to the right so that the air valve 106 again engages the valve seat 50. The clutch mechanism including the pawls 122 and the ratchet bar 132 will also move to the right in a following action by virtue of the compressed force of return spring 78. Further movement to the right of member 88 will cause the vacuum valve 48 to become unseated, and vacuum will again be exerted in variable pressure chamber 68. When there is a sufficient decrease of pressure in chamber 68, and therefore in chamber 118, piston 130 will move to the left relative to ratchet bar 132 against the force of spring 138 and the pawls 122 will be disengaged from teeth 134 and returned to the position shown in FIGURE 1. The various elements of the booster will return to the position shown in FIGURE 1 and each of the chambers 66, 68 and 70 will again have vacuum therein.

A booster having the features of the invention therein will provide an output force which is directly proportional to input displacement within limits determined by the magnitude of the power source, such as the differences in pressure in chamber 68 relative to atmosphere, and will provide an output force proportional to input force once the power source has been exhausted with no appreciable displacement lag between the two stages.

What is claimed is:

1. In a power booster,
   a housing having a movable power wall therein dividing said housing into a variable pressure chamber and a constant pressure chamber,
   a first source of constant first pressure and a second source of a second pressure different from the first pressure from the first source,
   valve means for selectively admitting said first and second pressures into said variable pressure chamber to control booster power and including a normally seated first pressure first control valve and a normally unseated second pressure second control valve and valve seat means for said valves,
   means for moving said first valve and said valve seat means relative to said second valve to seat said second valve on said valve seat means and for further moving said first valve relative to said said valve seat means and said second valve to unseat said first valve,
   said moving means comprising a manually movable member and a compression spring received in force transmitting relation between said manually movable member and said first valve.

2. In a vacuum suspended power booster having a valve seat and a normally unseated vacuum valve and an air valve normally seated on said valve seat,
   means for moving said valves into a lapped seated position and for further moving said air valve into an unseated position,
   said moving means comprising a manually movable member and a compression spring in series force transmitting relation between said manually movable member and said air valve.

3. In a differential pressure operated power booster having a power output member and a lapped valve mechanism selectively controlling pressures supplying power to said output member including a movable valve seat and a first movable valve and a second stationary valve.
   force transmitting valve actuating means including a manually movable member and a compression spring in series force transmitting connection with said first movable valve,
   and means responsive to output member power run-out for mechanically connecting said power output member and said manually movable member for further manual movement of said output member.

4. The mechanism of claim 3, said mechanically connecting means comprising
said first movable valve and said spring and a shoulder on said first movable valve receiving said manually movable member and providing parallel force transmitting paths between said manually movable member,
one force transmitting path being through said spring and the other force transmitting path being through said shoulder.

5. The mechanism of claim 3, said last named means including
   a power wall responsive to a minimum pressure differential supplied through said valve mechanism for for sensing output member power run-out and spring loaded ratchet means normally held in a disengaged position by said power wall and released to an engaged position when said power wall senses output member power run-out.

6. Mechanism selectively establishing a power wall drive and a manual drive comprising
   a power wall having a variable fluid pressure chamber on one side and a constant fluid pressure chamber on the other side and subject to balanced fluid pressure in a release position and power wall-moving differential fluid pressures in an actuated condition,
   a force transmitting output member connected to be moved by said power wall,
   valve means controlling the variable fluid pressure in said variable fluid pressure chamber to establish differential fluid pressures acting on said power wall,
   manually actuated valve actuating means movable to control said valve means,
   a second power wall responsive to the variable fluid pressure in said variable fluid pressure chamber,
   and clutch means operable by said second power wall at a predetermined fluid pressure in said variable fluid pressure chamber to operatively connect said output member in force transmitting relation with said manually actuated valve actuating means to provide a manual force transmitting path between said output member and said manually actuated valve actuating means.

7. The mechanism of claim 6, said clutch means comprising a ratchet secured to said output member and spring loaded pawl means,
   said second power wall normally holding said pawl means in a disengaged position and acting at the predetermined fluid pressure in said variable fluid pressure chamber to release said pawl means into force transmitting engagement with said ratchet.

8. The mechanism of claim 6, said manual force transmitting path including a valve support member intermediate said clutch means and said manually actuated valve actuating means.

9. The mechanism of claim 6 further comprising
   a valve support sleeve having a valve of said valve means mounted thereon,
   a yieldable spring interconnecting said valve support sleeve and said manually actuated valve actuating means in force transmitting relation,
   a ratchet bar having a plurality of teeth and secured to said output member and extending internally of said valve support sleeve,
   said second power wall including a second sleeve extending internally of said valve support sleeve and externally of said ratchet bar so that said ratchet bar is also received internally of said second sleeve,
   said clutch means including said ratchet bar and a plurality of fingers received in an enlarged end of the bore of said valve support sleeve and having adjacent ends engaging a shoulder formed by the enlarged bore end and spring means urging the other ends of said fingers radially inward to engage teeth of said ratchet bar,
   said second sleeve normally extending sufficiently into said enlarged bore end and radially intermediate said ratchet bar teeth and said fingers to hold said fingers out of engagement with said ratchet teeth, and means including said second power wall and a spring moving said second sleeve to permit said other ends of said fingers to be moved by said spring means into engagement with teeth of said ratchet bar.

10. The mechanism of claim 6, said manual force transmitting path including a spring and a portion of said valve means in series force transmitting relation intermediate said clutch means and said manually actuated valve actuating means.

11. The mechanism of claim 10, said spring being in said manual force transmitting path intermediate said valve means portion and said manually actuated valve actuating means.

12. The mechanism of claim 11, said valve means portion and said manually actuated valve actuating means having aligned shoulders engaging upon the application of a predetermined manual force sufficient to reduce the length of said spring a predetermined amount and thereby providing a mechanical force transmitting path directly between said valve means portion and said manually actuated valve actuating means and transmitting excess manual force above the predetermined manual force.

13. In a power brake booster having a valve controlled power boost and a manual push-through mechanism for manually actuating a brake system, manually movable valve actuating means comprising a movable member and a yieldable spring and a valve member in series force transmitting relation, a booster output member, selectively engageable manual force transmitting means in a force transmitting path between said booster output member and said valve member, and means holding said selectively engageable manual force transmitting means disengaged and responsive to a condition reflecting absence of available power to said booster output member to engage said manual force transmitting means to establish a manual force transmitting path.

14. The mechanism of claim 13, said holding means including a pressure sensitive power wall held in a disengaged holding position by power pressure available to said booster and means moving said power wall to permit engagement of said selectively engageable manual force transmitting means upon sensing the absence of power pressure available to said booster.

15. The mechanism of claim 13, said selectively engageable manual force transmitting means including a pawl and ratchet.

16. The mechanism of claim 13 further including means directly connecting said movable member and said valve member in parallel force transmitting relation with said yieldable spring upon the application of sufficient force to compress said spring a predetermined distance so as to transmit additional force around said spring.

References Cited by the Examiner

UNITED STATES PATENTS

| | | | |
|---|---|---|---|
| 2,739,672 | 3/1956 | Sandberg | 91—391 |
| 2,761,427 | 9/1956 | Shumaker | 91—373 |
| 3,076,441 | 2/1963 | Ayers | 91—434 |
| 3,120,155 | 2/1964 | Ayers | 60—54.6 |
| 3,120,156 | 2/1964 | Ayers | 91—391 |
| 3,143,926 | 8/1964 | Stelzer | 91—370 |
| 3,152,518 | 10/1964 | Ayers | 91—434 |

MARTIN P. SCHWADRON, *Primary Examiner.*

PAUL E. MASLOUSKY, *Examiner.*